US012612005B2

(12) United States Patent
Kitamura et al.

(10) Patent No.: US 12,612,005 B2
(45) Date of Patent: Apr. 28, 2026

(54) THREE-DIMENSIONAL AIR BAG

(71) Applicant: TOYODA GOSEI CO., LTD., Kiyosu (JP)

(72) Inventors: Daisuke Kitamura, Aichi (JP); Akira Yamashita, Aichi (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/073,555

(22) Filed: Mar. 7, 2025

(65) Prior Publication Data

US 2025/0296526 A1    Sep. 25, 2025

(30) Foreign Application Priority Data

Mar. 22, 2024    (JP) ................................. 2024-047370

(51) Int. Cl.
B60R 21/231        (2011.01)
B60R 21/205        (2011.01)

(52) U.S. Cl.
CPC .......... B60R 21/231 (2013.01); B60R 21/205 (2013.01)

(58) Field of Classification Search
CPC ............................ B60R 21/205; B60R 21/231
See application file for complete search history.

(56) References Cited

U.S. PATENT DOCUMENTS 6,361,073 B1 *    3/2002    Ortmann ............... B60R 21/231
                                                                  280/743.1
7,841,622 B2 *    11/2010    Pausch ................ B60R 21/2338
                                                                  280/743.2

7,934,747 B2 *    5/2011    Miyata .................. B60R 21/231
                                                                  280/743.1
8,256,798 B2 *    9/2012    Yamazaki ............. B60R 21/231
                                                                  280/743.1
8,757,656 B2 *    6/2014    Miyata .................. B60R 21/205
                                                                  280/743.1
8,851,513 B2 *    10/2014    Tsujimoto ............. B60R 21/231
                                                                  280/732

(Continued)

FOREIGN PATENT DOCUMENTS

JP        2015-016840 A      1/2015
KR        20170028757 A   *  3/2017    ........... B60R 21/205

OTHER PUBLICATIONS

KR-20170028757-A (machine translation) (Year: 2017).*

*Primary Examiner* — Jason D Shanske
*Assistant Examiner* — Joselynn Y Sliteris
(74) *Attorney, Agent, or Firm* — Posz Law Group, PLC

(57)    ABSTRACT

A three-dimensional air bag includes a first three-dimensional sewn portion in which the main panel and the first side panel portion are sewn together, and a second three-dimensional sewn portion in which the main panel and the second side panel portion are sewn together. A part of the first three-dimensional sewn portion and a part of the second three-dimensional sewn portion are located at an upper surface of the deployed and inflated air bag. A shape of the first three-dimensional sewn portion of the main panel in a natural state is different from a shape of the first three-dimensional sewn portion of the first side panel portion in a natural state. A shape of the second three-dimensional sewn portion of the main panel in the natural state is different from a shape of the second three-dimensional sewn portion of the second side panel portion in a natural state.

6 Claims, 8 Drawing Sheets

(56)                    References Cited

U.S. PATENT DOCUMENTS

| | | | | |
|---|---|---|---|---|
| 8,944,462 | B2 * | 2/2015 | Fischer | B60R 21/205 |
| | | | | 280/743.1 |
| 9,908,498 | B2 * | 3/2018 | Luna Nell | B60R 21/205 |
| 10,035,486 | B2 * | 7/2018 | Oh | B60R 21/231 |
| 11,338,760 | B2 * | 5/2022 | Koh | B60R 21/205 |
| 11,414,040 | B2 * | 8/2022 | Koh | B60R 21/205 |
| 11,858,452 | B2 * | 1/2024 | Koh | B60R 21/2338 |
| 2002/0041086 | A1 * | 4/2002 | Keshavaraj | B60R 21/231 |
| | | | | 280/743.1 |

* cited by examiner

THREE-DIMENSIONAL AIR BAG

CROSS-REFERENCE TO RELATED APPLICATION

This application is based on and claims priority under 35 USC 119 from Japanese Patent Application No. 2024-047370 filed on Mar. 22, 2024.

TECHNICAL FIELD

The present invention relates to an air bag mounted on a vehicle and deployed and inflated when an impact occurs.

BACKGROUND ART

Various types of air bag devices are known in which, when an impact occurs such as during a vehicle collision or sudden braking, an inflation fluid such as gas generated by an inflation fluid generation source such as an inflator is supplied to an air bag connected to the inflation fluid generation source, and the air bag is deployed and inflated between a vehicle body and an occupant to protect the occupant.

The air bag in an air bag device preferably has a three-dimensional sack shape because the air bag is required to be deployed and inflated. A three-dimensional sack-shaped air bag, that is, a three-dimensional air bag made by sewing together a plurality of panels, has been proposed (see, for example, Patent Literature 1).

In the three-dimensional air bag in which the plurality of panels are sewn together as introduced in Patent Literature 1, a plurality of portions for sewing the panels (hereinafter referred to as sewn portions as necessary) are formed.

PATENT LITERATURE

Patent Literature 1: JP2015-16840A

SUMMARY OF INVENTION

As one type of three-dimensional air bag, for example, as illustrated in FIG. 3, an air bag is described in which a long main panel 902 and a pair of side panels (a first side panel 903 and a second side panel 904) are sewn together.

In this type of three-dimensional air bag 901, the main panel 902 is sandwiched between a pair of side panels 903 and 904 that are spaced apart from each other. Further, the three-dimensional air bag 901 is formed by sewing two long sides of the main panel 902 to outer peripheries of the side panels 903 and 904.

In the three-dimensional air bag 901 illustrated in FIG. 3, the main panel 902 functions as a gusset fabric between the pair of side panels 903 and 904. Accordingly, the three-dimensional air bag 901 is three-dimensional in a distance direction of the pair of side panels 903 and 904. Further, the three-dimensional air bag 901 has gently curved surfaces that correspond to outer peripheral shapes of the pair of side panels 903 and 904.

The three-dimensional air bag 901 illustrated in FIG. 3 has the gently curved surfaces facing an occupant or a vehicle interior structure having relatively low strength, such as a windshield. Due to a shape thereof, the curved surfaces impart less load to the vehicle interior structure and the occupant with which the curved surfaces come into strong contact when an impact occurs, making it advantageous as surfaces of the three-dimensional air bag 901 that face the vehicle interior structure and the occupant.

The three-dimensional air bag 901 illustrated in FIG. 3 includes a first sewn portion 911 where the main panel 902 and the first side panel 903 are sewn together, and a second sewn portion 912 where the main panel 902 and the second side panel 904 are sewn together. The first sewn portion 911 and the second sewn portion 912 are formed with the gentle curved surfaces corresponding to the outer peripheral shapes of the pair of side panels 903 and 904.

FIG. 4 illustrates panels in a state before being sewn together with other panels. Each panel illustrated in FIG. 4 may also be referred to as a panel of the air bag with seams unstitched. Each panel is a fabric having a flat shape, and is to be sewn together to form a three-dimensional air bag having a three-dimensional sack shape.

In the present specification, such a state of the panel is referred to as a natural state. The natural state can also be referred to as a state in which the panel is placed on a flat plate or a state in which an external force except for gravity is not applied to the panel.

The flat shape in the present specification means a flat shape from a macroscopic viewpoint, and can also be referred to as a flat state of the panel. Specifically, a state in which the panel is not bent vertically, a state in which the panel is not significantly bent vertically, or a state in which 80% or more of an area of the panel placed on a planar surface is uniformly grounded on the planar surface can be said that the panel has a flat shape. A three-dimensional shape refers to a state in which the panel has a three-dimensional spatial spread from a macroscopic viewpoint, and can be referred to as a state in which the panel is not the flat shape.

As illustrated in FIG. 4, a shape of the first sewn portion 911 of the main panel 902 in the natural state is different from a shape of the first sewn portion 911 of the first side panel 903 in the natural state. A shape of the second sewn portion 912 of the main panel 902 in the natural state and a shape of the second sewn portion 912 of the second side panel 904 in the natural state are also different.

Such first sewn portion 911 and second sewn portion 912 are advantageous in forming the above-mentioned gently curved surfaces.

However, on the other hand, in a case in which the main panel 902 and the first side panel 903 are sewn together, it is necessary to perform sewing by causing the first sewn portion 911 of the main panel 902 and the first sewn portion 911 of the first side panel 903 to gradually overlap with each other, while aligning shapes of a long side of the main panel 902 with an outer periphery of the first side panel 903.

Similarly, in a case in which the main panel 902 and the second side panel 904 are sewn together, it is necessary to perform sewing by causing the second sewn portion 912 of the main panel 2 and the second sewn portion 912 of the second side panel 904 to gradually overlap with each other, while aligning shapes of the long side of the main panel 902 and the outer periphery of the second side panel 904.

Such work is very complicated, and therefore there is a problem that manufacturing defects are likely to occur. Furthermore, this sewing method has a problem that it is difficult to form a complex uneven shape having a series of fine curves.

Hereinafter, in the present specification, this type of sewing style is sometimes called three-dimensional sewing.

As another type of three-dimensional air bag 901, for example, as illustrated in FIG. 5, an air bag is described in which a short main panel 902 and a pair of side panels (the first side panel 903 and the second side panel 904) are sewn together.

In this type of three-dimensional air bag 901, predetermined portions of outer peripheries of the pair of side panels 903 and 904 are spaced apart from each other, and the main panel 902 is sandwiched therebetween. Another predetermined portions of the outer peripheries of the pair of side panels 903 and 904 face each other. Further, another predetermined portion of the outer periphery of each of the side panels 903 and 904 faces another predetermined region of the outer periphery of the respective one of the side panels 903 or 904.

Furthermore, two long sides of the main panel 902 are sewn to partial regions of the outer peripheries of the side panels 903 and 904, respectively, the pair of side panels 903 and 904 are sewn to each other, and a part of the outer periphery of each of the side panel 903 and the side panel 904 is sewn to another part of the outer periphery of each of the side panel 903 and the side panel 904, thereby forming the three-dimensional air bag 901.

In the three-dimensional air bag 901 illustrated in FIG. 5, the main panel 902 functions as a gusset fabric between the pair of side panels 903 and 904, and a part of the outer periphery of each of the side panels 903 and 904 is sewn to the other part of the outer periphery of each of the side panel 903 and the side panel 904 to form the three-dimensional air bag.

The three-dimensional air bag 901 illustrated in FIG. 5 includes a first sewn portion 911 where the main panel 902 and the first side panel 903 are sewn together, a second sewn portion 912 where the main panel 902 and the second side panel 904 are sewn together, a third sewn portion 913 where the first side panel 903 and the second side panel 904 are sewn together, a fourth sewn portion 914 where the first side panel 903 itself is sewn, and a fifth sewn portion 915 where the second side panel 904 itself is sewn.

FIG. 6 illustrates panels in a natural state.

As illustrated in FIG. 6, a shape of the first sewn portion 911 of the main panel 902 in the natural state is the same as a shape of the first sewn portion 911 of the first side panel 903 in the natural state. A shape of the second sewn portion 912 of the main panel 902 in the natural state and a shape of the second sewn portion 912 of the second side panel 904 in the natural state are also the same.

A shape of the third sewn portion 913 of the first side panel 903 in the natural state and a shape of the third sewn portion 913 of the second side panel 904 in the natural state are also the same. The two fourth sewn portions 914 of the first side panel 903 in the natural state also have the same shape, and the two fifth sewn portions 915 of the second side panel 904 in the natural state also have the same shape.

Therefore, when the first sewn portion 911 is formed by sewing the main panel 902 and the first side panel 903 together, the long side of the main panel 902 and a part of the outer periphery of the first side panel 903, which have the same shape, are simply overlapped and sewn together. Such a first sewn portion 911 can be easily formed even if the first sewn portion 911 has a relatively complicated shape, such as a series of curved lines.

The same applies to a case in which the second sewn portion 912 is formed by sewing the main panel 902 and the second side panel 904 together, a case in which the third sewn portion 913 is formed by sewing the first side panel 903 and the second side panel 904 together, a case in which the fourth sewn portion 914 is formed by sewing the first side panel 903, and a case in which the fifth sewn portion 915 is formed by sewing the second side panel 904.

The above-mentioned work is relatively easy and has the advantage that manufacturing defects are unlikely to occur.

On the other hand, the three-dimensional air bag 901 illustrated in FIG. 5 has many sewn portions, and the sewn portions are distributed over the entire three-dimensional air bag 901. Since the sewn portions are more rigid than other portions, a three-dimensional air bag having many sewn portions has a high overall rigidity, and therefore exerts a large reaction force on the vehicle interior structure and the occupant at the time of deployment and inflation of the three-dimensional air bag. Therefore, this type of three-dimensional air bag requires careful consideration of a placement position and an internal structure, which results in poor versatility.

Further, in this type of three-dimensional air bag, each of the first and second side panels in which a part is required to be sewn to itself, has a complex and large shape, which results in a problem of low yield.

Hereinafter, in the present specification, this type of sewing style is sometimes called plane sewing.

The present invention has been made in view of the above circumstances, and an object thereof is to provide a technique capable of easily manufacturing an air bag with a small load to an occupant and a vehicle interior structure.

An aspect of the present invention is directed to a three-dimensional air bag in which a main panel and a side panel including a first side panel portion and a second side panel portion are sewn together, the air bag comprising:

a first three-dimensional sewn portion in which the main panel and the first side panel portion are sewn together, and a second three-dimensional sewn portion in which the main panel and the second side panel portion are sewn together, wherein at least a part of the first three-dimensional sewn portion and at least a part of the second three-dimensional sewn portion are located at an upper surface of the air bag when the air bag is deployed and inflated, a shape of the first three-dimensional sewn portion of the main panel in a natural state is different from a shape of the first three-dimensional sewn portion of the first side panel portion in a natural state, and a shape of the second three-dimensional sewn portion of the main panel in the natural state is different from a shape of the second three-dimensional sewn portion of the second side panel portion in a natural state.

According to the technique of the present invention, it is possible to easily manufacture an air bag with a small load to an occupant and a vehicle interior structure.

DESCRIPTION OF EMBODIMENTS

As a result of intensive studies to solve the above problems, the inventors of the present invention invented a three-dimensional air bag in which a main panel, a first side panel, and a second side panel are sewn together, and applied for an application (Japanese Patent Application No. 2024-033418). Hereinafter, the air bag is referred to as a three-piece three-dimensional air bag as necessary.

Figure 7:
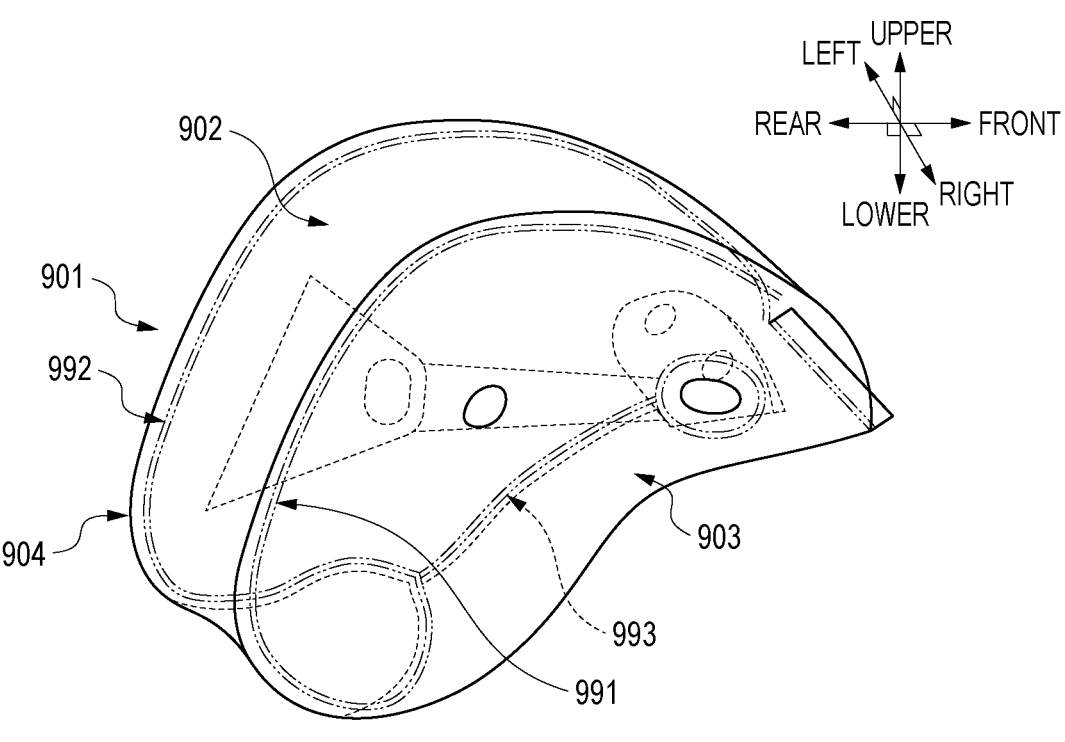
FIG. 7 is a diagram schematically illustrating another example of the conventional three-dimensional air bag.

For example, as illustrated in FIG. 7, a three-piece three-dimensional air bag 901 includes a first three-dimensional sewn portion 991 where the main panel 902 and the first side panel 903 are sewn together, a second three-dimensional sewn portion 992 where the main panel 902 and the second side panel 904 are sewn together, and a plane sewn portion 993 where the first side panel 903 and the second side panel 904 are sewn together.

Figure 8:
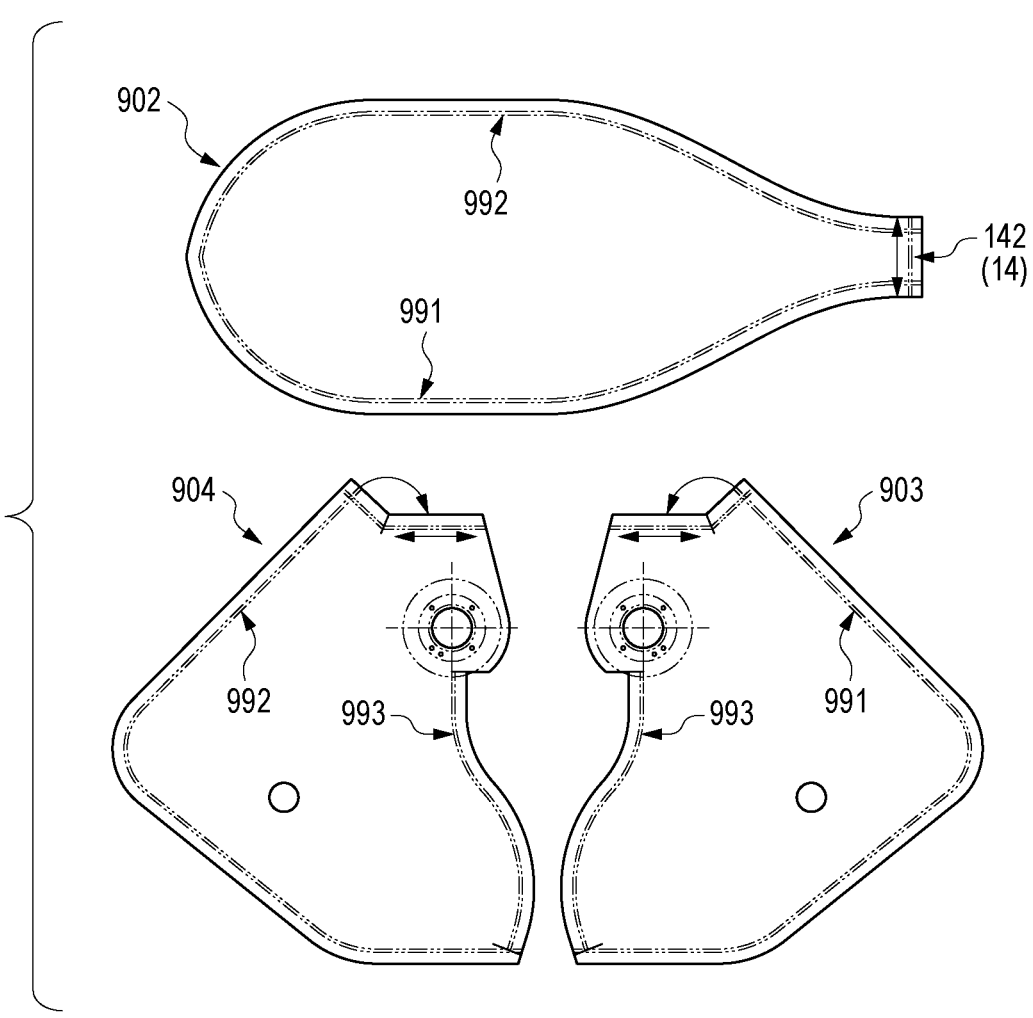
FIG. 8 is a diagram illustrating sewn portions in the other example of the conventional three-dimensional air bag.

FIG. 8 illustrates panels in a natural state.

As illustrated in FIG. 8, in the three-piece three-dimensional air bag 901, a shape of the first three-dimensional sewn portion 991 of the main panel 902 in the natural state is different from a shape of the first three-dimensional sewn portion 991 of the first side panel 903 in the natural state. In the three-piece three-dimensional air bag 901, a shape of the second three-dimensional sewn portion 992 of the main panel 902 in the natural state is different from a shape of the second three-dimensional sewn portion 992 of the second side panel 904 in the natural state. Therefore, the first three-dimensional sewn portion 991 and the second three-dimensional sewn portion 992 of the three-piece three-dimensional air bag 901 can be formed by the three-dimensional sewing described above.

In the three-piece three-dimensional air bag 901, a shape of the plane sewn portion 993 of the first side panel 903 in the natural state is the same as a shape of the plane sewn portion 993 of the second side panel 904 in the natural state. Therefore, the plane sewn portion 993 of the three-piece three-dimensional air bag 901 can be formed by the plane sewing described above.

As described above, the three-piece three-dimensional air bag is manufactured by combining three-dimensional sewing and plane sewing. According to such a three-piece three-dimensional air bag, a complicated three-dimensional shape derived from the plane sewing can be easily formed by the plane sewn portion, and a gently curved surface derived from the three-dimensional sewing can be easily formed by the first three-dimensional sewn portion and the second three-dimensional sewn portion. Hereinafter, as necessary, the plane sewn portion of the first side panel in the natural state may be referred to as a first plane sewn portion, and the plane sewn portion of the second side panel in the natural state may be referred to as a second plane sewn portion.

Figure 3:
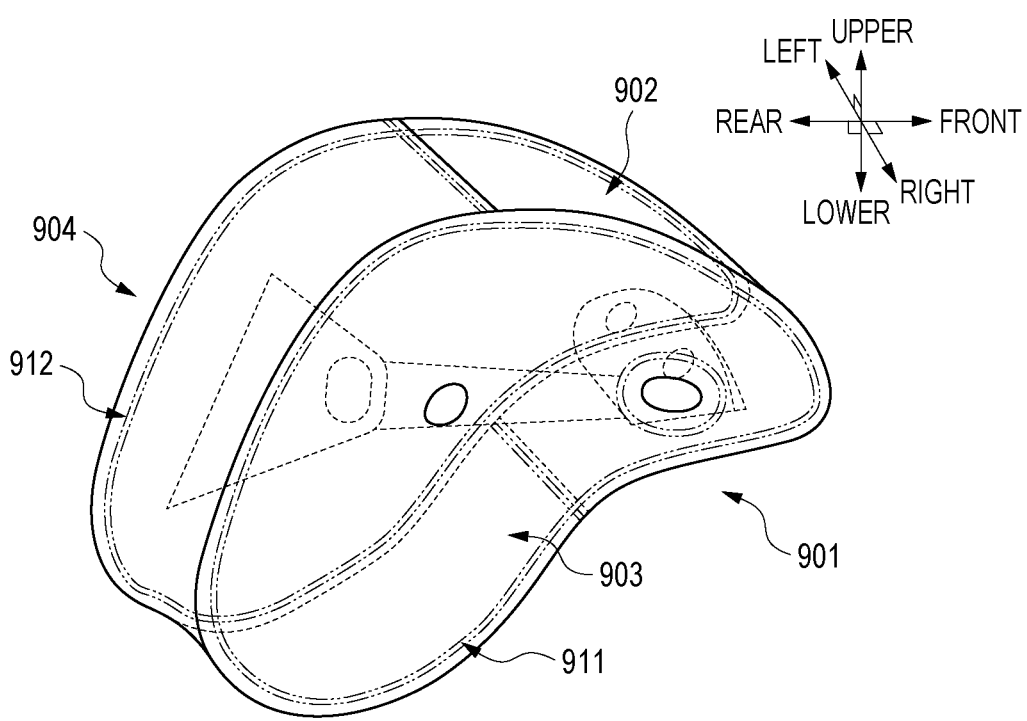
FIG. 3 is a diagram schematically illustrating an example of a conventional three-dimensional air bag.
Figure 4:
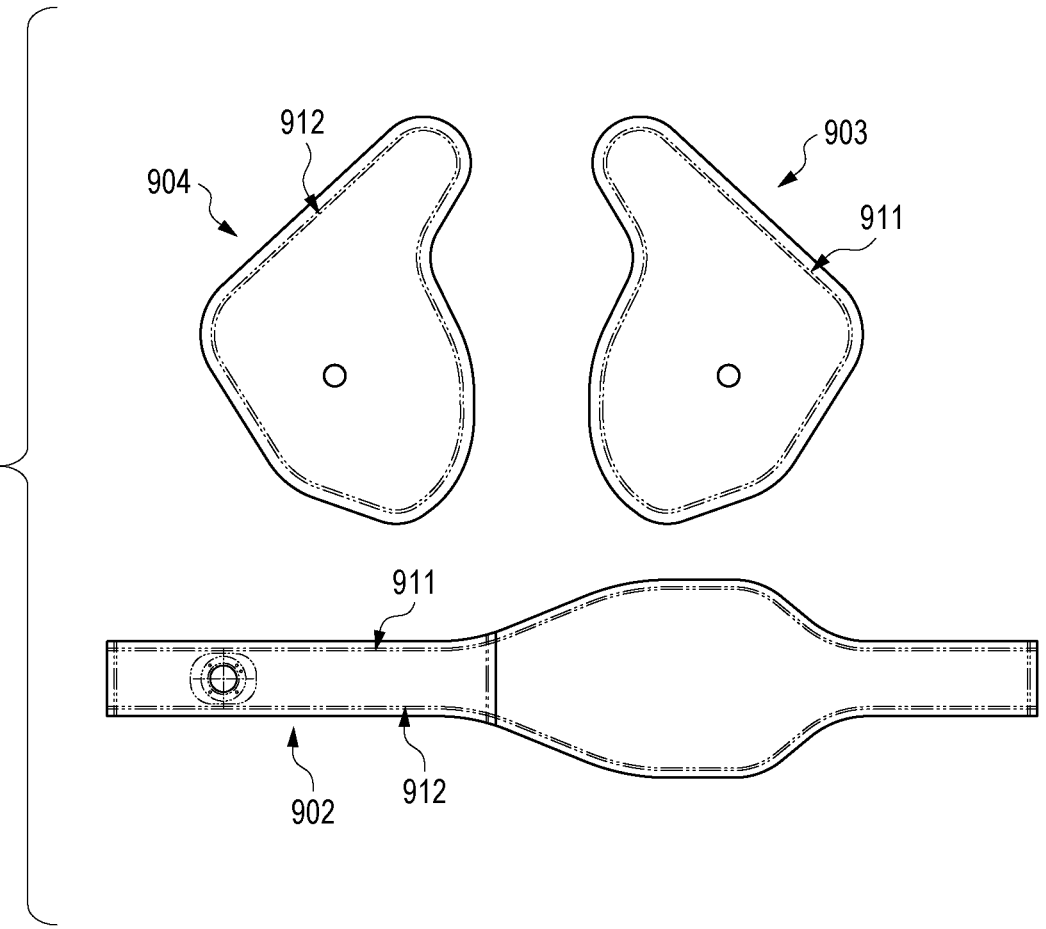
FIG. 4 is a diagram illustrating sewn portions in the example of the conventional three-dimensional air bag.
Figure 5:
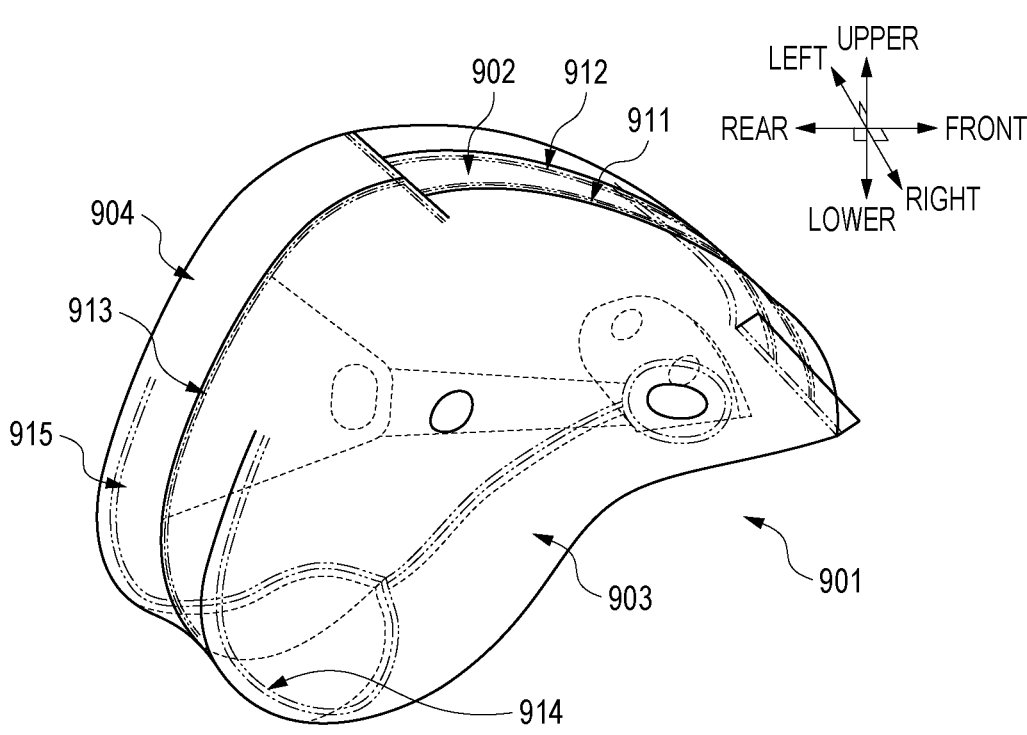
FIG. 5 is a diagram schematically illustrating another example of the conventional three-dimensional air bag.
Figure 6:
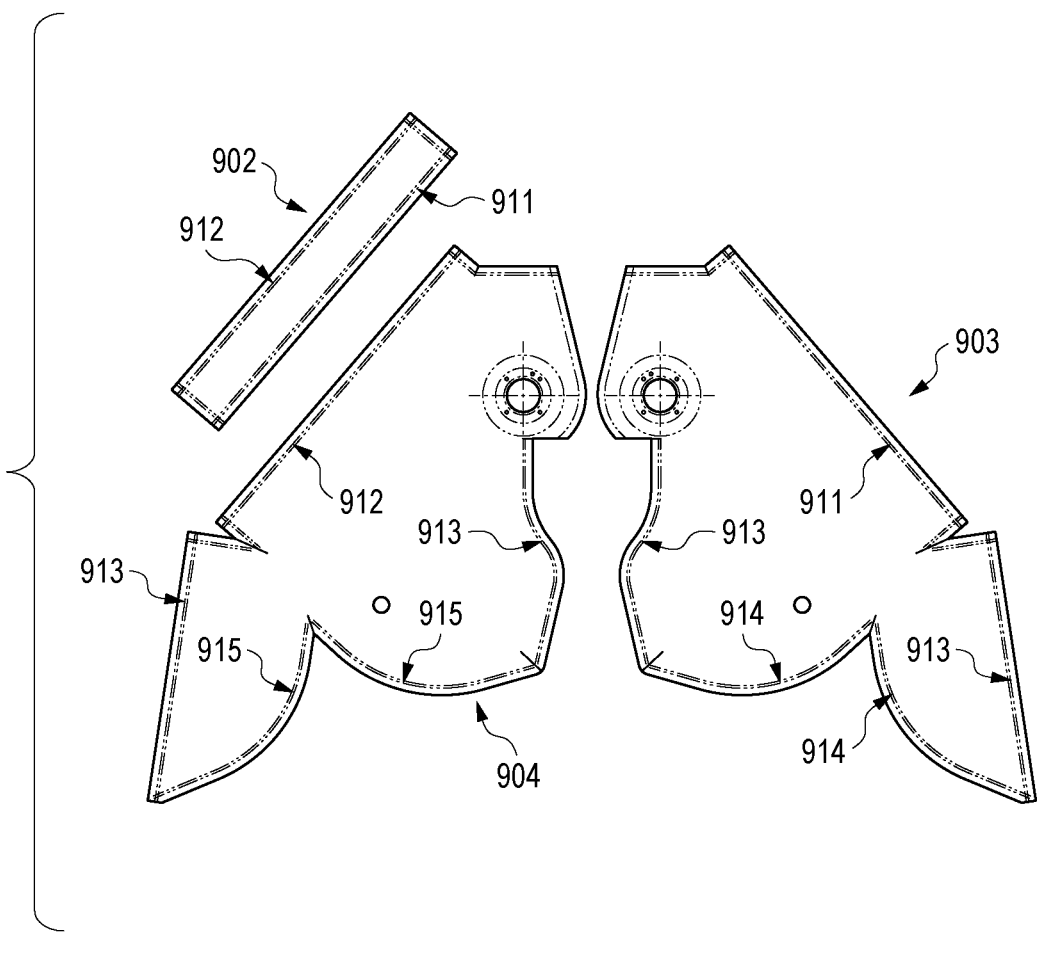
FIG. 6 is a diagram illustrating sewn portions in the other example of the conventional three-dimensional air bag.

Similarly to various devices and components mounted on a vehicle, there is a demand for reducing the number of work steps for an air bag device for the vehicle. The three-piece three-dimensional air bag illustrated in FIGS. 7 and 8 is significantly advantageous in terms of the manufacturing process, the yield, and the like, as compared with a conventional three-dimensional air bag illustrated in FIGS. 3 and 4, which is sewn only by three-dimensional sewing, and a conventional three-dimensional air bag illustrated in FIGS. 5 and 6, which is sewn only by plane sewing. However, even in the three-piece three-dimensional air bag, there is still room for reduction in the number of work steps.

The inventors of the present invention have attempted to omit a part of a sewn portion of each panel in order to reduce the number of steps in manufacturing the above-described three-piece three-dimensional air bag. In the three-piece three-dimensional air bag, attention was paid to the fact that a shape of the first plane sewn portion and a shape of the second plane sewn portion are the same.

As described above, the first plane sewn portion and the second plane sewn portion having the same shape can be subjected to plane sewing in which the first plane sewn portion and the second plane sewn portion overlap each other. The inventors of the present invention have conceived that the first side panel and the second side panel are connected to each other at portions corresponding to the first plane sewn portion and the second plane sewn portion to form one side panel. When such a side panel is provided, the plane sewn portion can be eliminated or a length of the plane sewn portion can be reduced.

Since such a side panel has a large outer shape, there is a possibility that the yield is deteriorated as compared with the first side panel and the second side panel in the three-piece three-dimensional air bag described above. However, on the other hand, since the plane sewn portion can be eliminated or the length of the plane sewn portion can be reduced, it is considered that a step of sewing the first side panel and the second side panel to form the plane sewn portion can be eliminated or the number of work steps of the step can be reduced.

A three-dimensional air bag according to the present invention is an air bag in which a main panel and a side panel including a first side panel portion and a second side panel portion are sewn together. The side panel including the first side panel portion and the second side panel portion corresponds to a single side panel in which the first side panel and the second side panel are connected to each other at portions corresponding to the first plane sewn portion and the second plane sewn portion.

The three-dimensional air bag according to the present invention includes a first three-dimensional sewn portion in which the main panel and the first side panel portion are sewn together, and a second three-dimensional sewn portion in which the main panel and the second side panel portion are sewn together.

In the air bag according to the present invention, a shape of the first three-dimensional sewn portion of the main panel in the natural state is different from a shape of the first three-dimensional sewn portion of the first side panel portion in the natural state. Further, a shape of the second three-dimensional sewn portion of the main panel in the natural state is different from a shape of the second three-dimensional sewn portion of the second side panel portion in the natural state.

Therefore, the first three-dimensional sewn portion and the second three-dimensional sewn portion can be formed by three-dimensional sewing, similarly to the above-described three-piece three-dimensional air bag. Thus, according to the three-dimensional air bag of the present invention, a gently curved surface derived from three-dimensional sewing can be easily formed by the first three-dimensional sewn portion and the second three-dimensional sewn portion.

Further, the three-dimensional air bag according to the present invention includes one side panel including the first side panel portion and the second side panel portion instead of two panels of the first side panel and the second side panel in the three-piece three-dimensional air bag. Therefore, according to the three-dimensional air bag of the present invention, it is possible to eliminate the step of sewing the first side panel and the second side panel in the three-piece three-dimensional air bag to form the plane sewn portion, and it is possible to reduce the number of work steps of the step.

Here, an upper surface of the air bag mounted on the vehicle faces an occupant or a vehicle interior structure having relatively low strength, such as a windshield. Therefore, preferably, the upper surface of the air bag has a shape that applies a small load to the vehicle interior structure and the occupant when an impact occurs, and as described above, three-dimensional sewing is advantageous in forming this shape.

In the three-dimensional air bag according to the present invention, at least a part of the first three-dimensional sewn portion and at least a part of the second three-dimensional sewn portion, which are three-dimensional sewn portions, are located on the upper surface of the air bag at the time of deployment and inflation. Accordingly, in the three-dimensional air bag according to the present invention, it is possible to reduce a load applied to the vehicle interior structure and the occupant when an impact occurs.

In the three-dimensional air bag according to the present invention, the first side panel portion and the second side panel portion are integrally continuous. Therefore, at the time of manufacturing the three-dimensional air bag of the present invention, a step of forming the plane sewn portion of the three-piece three-dimensional air bag described above is unnecessary at least in the continuous portion. Accordingly, manufacturing defects are unlikely to occur when the three-dimensional air bag according to the present invention is manufactured.

In the three-dimensional air bag according to the present invention, since the first side panel portion and the second side panel portion are continuous and form an integrated side panel, the first side panel portion and the second side panel portion are positioned in advance with high accuracy. Accordingly, a work of sewing the main panel and the first side panel portion together to form the first sewn portion and a work of sewing the main panel and the second side panel portion together to form the second sewn portion become very easy.

By combining these factors, it can be said that the technique of the present invention can easily manufacture an air bag that applies a small load to the occupant and the vehicle interior structure.

The three-dimensional air bag according to the present invention is formed of two panels, that is, a main panel and a side panel. Therefore, the three-dimensional air bag according to the present invention can be referred to as a two-piece three-dimensional air bag.

Hereinafter, the three-dimensional air bag according to the present invention will be described for each component thereof. Hereinafter, unless otherwise specified, the air bag means a three-dimensional air bag.

In the following description, front, rear, upper, and lower refer to the front, rear, upper, and lower of an air bag mounted in a vehicle and deployed and inflated, and in this regard, front refers to a front side in a forward direction of the vehicle, and rear refers to a front side in a reverse direction of the vehicle. Upper and lower refer to an upper-lower direction of the vehicle, in other words, upper and lower in a vertical direction.

Unless otherwise specified, a numerical range "x to y" described in the present specification includes a lower limit value x and an upper limit value y. The upper limit value, the lower limit value, and numerical values listed in the embodiments may be freely combined to form a new numerical value range. Further, a numerical value freely selected from the above-described numerical value range can be set as an upper limit numerical value or a lower limit numerical value of a new numerical value range.

An air bag according to the present invention is an air bag in which a main panel and a side panel are sewn together.

As described above, the side panel includes the first side panel portion and the second side panel portion, and includes the first three-dimensional sewn portion in which the main panel and the first side panel portion are sewn together, and the second three-dimensional sewn portion in which the main panel and the second side panel portion are sewn together. The air bag according to the present invention has a boundary portion between the first side panel portion and the second side panel portion.

The first side panel portion and the second side panel portion may have different shapes or the same shape. The first side panel portion and the second side panel portion having the same shape means that the first side panel portion and the second side panel portion have a line-symmetrical shape with respect to a boundary portion as an axis of symmetry.

When the first side panel portion and the second side panel portion have the same shape, the same pattern can be used for both the first side panel portion and the second side panel portion, which is advantageous in terms of cost. In addition, when the first side panel portion and the second side panel portion have the same shape, the side panel can be cut in a state of being folded in two with the plane sewn portion as a center line, and thus there is an advantage that the number of work steps required for cutting the side panel or the like is reduced.

Here, as described above, the side panel of the air bag according to the present invention can be said to be a side panel in which the first side panel and the second side panel in the above-described three-piece three-dimensional air bag are connected to each other at a portion corresponding to the first plane sewn portion and the second plane sewn portion.

In consideration of the manufacturing cost of the side panel in the air bag according to the present invention, the side panel is preferably designed to be planar.

For example, in the three-piece three-dimensional air bag, as illustrated in FIGS. 7 and 8, the first plane sewn portion and the second plane sewn portion may be curved. In this case, the side panel in which the first side panel and the second side panel in the three-piece three-dimensional air bag are connected to each other at the portion corresponding to the first plane sewn portion and the second plane sewn portion is warped or inflated at a portion corresponding to the first plane sewn portion and the second plane sewn portion. That is, the side panel has a three-dimensional shape in a natural state. In order to manufacture a side panel having a three-dimensional shape, a special weaving machine, a shaping step, and the like are required, and the manufacturing cost of the side panel increases.

The inventors of the present invention have conceived that the side panel in the natural state can be formed into a flat shape by designing the first plane sewn portion and the second plane sewn portion into a linear shape.

That is, the side panel of the three-dimensional air bag according to the present invention preferably has a flat shape in the natural state. As described above, in the side panel having a flat shape in the natural state, the boundary between the first side panel portion and the second side panel portion may extend linearly. The boundary corresponds to a portion corresponding to the first plane sewn portion in the first side panel of the three-piece three-dimensional air bag and a portion corresponding to the second plane sewn portion in the second side panel of the three-piece three-dimensional air bag, and may be referred to as a portion where these two portions are joined.

Hereinafter, the boundary may be referred to as a linear boundary portion as necessary.

When the linear boundary portion of the side panel extends linearly, the first side panel portion and the second side panel portion are disposed in a plane with the boundary portion interposed therebetween. Therefore, the side panel having a flat shape can be manufactured at a low cost, and there is an advantage that the manufacturing cost of the three-dimensional air bag according to the present invention including the side panel can be reduced.

The main panel and the side panel may be made of the same material or different materials. Materials for the main panel, the side panel, and a thread used for sewing these panels, that is, materials for the air bag, will be described in detail later.

The air bag according to the present invention includes a first three-dimensional sewn portion in which the main panel and the first side panel portion are sewn together, and a second three-dimensional sewn portion in which the main panel and the second side panel portion are sewn together. The air bag according to the present invention may include other sewn portions in addition to the first three-dimensional sewn portion and the second three-dimensional sewn portion. As an example of the other sewn portion, an overlapped sewn portion to be described later can be given, and in addition, for example, a plane sewn portion in which the first side panel portion and the second side panel portion are sewn together can be given. The overlapped sewn portion and the plane sewn portion will be described in detail later.

The sewn portions described above are portions where the corresponding panels are sewn together, and each can be said to have a linear shape.

In each panel in a natural state, each of these sewn portions may be imaginary lines. Alternatively, indication lines may be drawn on the panels in the natural state at positions corresponding to these sewn portions.

When the side panel has a flat shape and the three-dimensional air bag according to the present invention includes a linear boundary portion in addition to the sewn portion, the linear boundary portion is a portion that is a boundary between the first side panel portion and the second side panel portion and extends linearly, and the linear boundary portion also has a linear shape.

A shape of the linear boundary portion of the first side panel portion may be the same as a shape of the linear boundary portion of the second side panel portion.

The linear boundary portion may be present as an imaginary line in the air bag according to the present invention and the side panel in the natural state. Alternatively, in the air bag according to the present invention and the side panel in the natural state, an indication line may be drawn at a position corresponding to the linear boundary portion.

In the air bag of the present invention, at least a part of the first three-dimensional sewn portion and at least a part of the second three-dimensional sewn portion are located on an upper surface of the air bag at the time of deployment and inflation. In other words, at least a part of the first three-dimensional sewn portion and at least a part of the second three-dimensional sewn portion are located at positions facing an occupant or a vehicle interior structure having relatively low strength, such as a windshield. As described above, this is advantageous in reducing a load applied to the vehicle interior structure and the occupant by the air bag according to the present invention when an impact occurs.

In the air bag of the present invention, at least a part of the first three-dimensional sewn portion and at least a part of the second three-dimensional sewn portion may be provided on the upper surface of the air bag at the time of deployment and inflation, and for example, the entire first three-dimensional sewn portion and the entire second three-dimensional sewn portion may be provided on the upper surface of the air bag at the time of deployment and inflation. Further, in consideration of a positional relationship between the air bag and a seat mounted in a vehicle cabin, it is also preferable that at least a part of the first three-dimensional sewn portion and at least a part of the second three-dimensional sewn portion are located on the upper surface and a rear surface of the air bag at the time of deployment and inflation.

In the present specification, the upper surface of the air bag refers to a surface of the air bag at the time of deployment and inflation, and means an area that is located on an upper side when the air bag is divided into two equal parts in the upper-lower direction. The lower surface of the air bag refers to a surface of the air bag at the time of deployment and inflation, and means an area that is located on a lower side when the air bag is divided into two equal parts in the upper-lower direction. The front surface of the air bag refers to a surface of the air bag at the time of deployment and inflation, and means an area that is located on a front side when the air bag is divided into two equal parts in the front-rear direction. Further, the rear surface of the air bag refers to a surface of the air bag at the time of deployment and inflation, and means an area that is located on a rear side when the air bag is divided into two equal parts in the front-rear direction.

The air bag according to the present invention may include a plane sewn portion in which the first side panel portion and the second side panel portion are sewn together. In this case, a shape of the plane sewn portion of the first side panel portion in the natural state is the same as a shape of the plane sewn portion of the second side panel portion in the natural state. Therefore, the plane sewn portion of the air bag according to the present invention can be formed by the plane sewing described above.

The plane sewn portion may be located at any position in the air bag. For example, as in the air bag according to Embodiment 1, the plane sewn portion may be continuous with the linear boundary portion.

In the air bag according to the present invention, at least a part of the plane sewn portion is located on the lower surface of the air bag at the time of deployment and inflation.

Here, there are various vehicle interior parts such as an instrument panel and a steering wheel below an air bag mounted on a vehicle, and these vehicle interior parts come into contact with the air bag at the time of deployment and inflation to generate a reaction force. Since the reaction force is generated with a sufficient magnitude and in a sufficient area, the air bag can stably receive the occupant or the like to be protected at the time of deployment and inflation of the air bag.

In order to sufficiently generate the above-described reaction force, it is preferable to form a shape of a portion of the air bag facing the vehicle interior parts at the time of deployment and inflation into an uneven shape corresponding to the vehicle interior parts.

In the air bag according to the present invention, when at least a part of the above-described plane sewn portion is located on the lower surface of the air bag at the time of deployment and inflation, the lower surface of the air bag can be easily formed into a complicated three-dimensional shape corresponding to vehicle interior parts below the plane sewn portion. Therefore, in this case, the air bag according to the present invention can sufficiently generate a reaction force due to the vehicle interior parts at the time of deployment and inflation of the air bag.

In the air bag according to the present invention, only a part of the plane sewn portion may be located on the lower surface of the air bag at the time of deployment and inflation, or the entire plane sewn portion may be located on the lower surface of the air bag at the time of deployment and inflation. Further, in consideration of a positional relationship between the air bag and the vehicle interior parts mounted in a vehicle cabin, it is also preferable that at least a part of the plane sewn portion is located on the lower surface and the front surface of the air bag at the time of deployment and inflation.

A position of the linear boundary portion at the time of deployment and inflation of the air bag is not particularly limited. However, when the air bag according to the present invention includes the plane sewn portion described above and the plane sewn portion is continuous with the linear boundary portion, it can be said that at least a part of the linear boundary portion continuous with the plane sewn portion is also highly likely to be located on the lower surface of the air bag.

In order to make a shape of the lower surface of the air bag more finely correspond to a complicated three-dimensional shape corresponding to the vehicle interior part located below the air bag, it is useful to prevent a portion of the air bag in the vicinity of the plane sewn portion from being rugged or stretched.

For this purpose, it is preferable to form a cut portion between the plane sewn portion of the first side panel portion in the natural state and the plane sewn portion of the second side panel portion in the natural state. Specifically, the cut portion may have a tapered slit shape, and it is more preferable that a tip portion of the cut portion is directed to a boundary between the first side panel portion and the second side panel portion, that is, a linear boundary portion.

By forming the cut portion, it is possible to remove excess fabric between the plane sewn portion of the first side panel portion in the natural state and the plane sewn portion of the second side panel portion in the natural state. Accordingly, it is possible to eliminate or prevent the occurrence of stiffness or struts in the vicinity of the plane sewn portion of the air bag due to the excess fabric. As a result, a shape of the lower surface of the air bag can be made close to a complicated three-dimensional shape corresponding to the vehicle interior part located below the air bag, and the reaction force by the vehicle interior part can be more stably generated at the time of deployment and inflation of the air bag.

In the air bag according to the present invention, a shape of the first three-dimensional sewn portion of the main panel in the natural state is different from a shape of the first three-dimensional sewn portion of the first side panel portion in the natural state, and the shapes are not particularly limited.

Similarly, the shape of the second three-dimensional sewn portion of the main panel in the natural state is different from the shape of the second three-dimensional sewn portion of the second side panel portion in the natural state, and the shapes are not particularly limited.

Further, a shape of the plane sewn portion of the first side panel portion in the natural state is the same as a shape of the plane sewn portion in the second side panel portion in the natural state, and the shapes are not particularly limited.

However, as described above, a shape of the first side panel portion is preferably the same as a shape of the second side panel portion, and a shape of the first three-dimensional sewn portion of the first side panel portion in the natural state is preferably the same as a shape of the second three-dimensional sewn portion of the second side panel portion in the natural state.

Further, similarly, the shape of the first three-dimensional sewn portion of the main panel in the natural state is preferably the same as the shape of the second three-dimensional sewn portion of the main panel in the natural state.

In this case, preferably, the main panel in the natural state has a line-symmetrical shape with a midline between the first three-dimensional sewn portion and the second three-dimensional sewn portion as an axis of symmetry.

As described above, the air bag according to the present invention may include other sewn portions than the first three-dimensional sewn portion and the second three-dimensional sewn portion.

The overlapped sewn portion, which is one type of the other sewn portion, is a portion in which a part of the main panel, a part of the first side panel portion, and a part of the second side panel portion are overlapped and sewn together.

When the air bag according to the present invention includes the overlapped sewn portion described above, the overlapped sewn portion is preferably a plane sewn portion. Further, preferably, a shape of the overlapped sewn portion of the main panel in the natural state, a shape of the overlapped sewn portion of the first side panel portion in the natural state, and a shape of the overlapped sewn portion of the second side panel portion in the natural state are the same.

By using the plane sewn portion as the overlapped sewn portion, the main panel, the first side panel portion, and the second side panel portion can be easily sewn to close an outer periphery of the air bag, and the sack-shaped air bag can be easily formed.

The overlapped sewn portion is a portion having relatively high rigidity, in which a part of the main panel, a part of the first side panel portion, and a part of the second side panel portion are overlapped and sewn together. Therefore, preferably, at least a part of the overlapped sewn portion is located away from the occupant, specifically, on the front surface of the air bag at the time of deployment and inflation. It is also preferable that at least a part of the overlapped sewn portion is located on the front surface and the lower surface of the air bag at the time of deployment and inflation.

The air bag according to the present invention has a hollow sack shape and is mounted on a vehicle to protect the occupant when an impact caused by a collision occurs. The air bag may be disposed in any portion of the vehicle, and as described above, it is particularly preferable that the air bag is mounted on a steering wheel or mounted on a portion of a back surface side of an instrument panel positioned in front of a passenger seat, and is interposed between the occupant and a windshield.

The air bag according to the present invention is connected to an inflation fluid generation source, and is deployed and inflated by being supplied with an inflation fluid when an impact occurs, but is folded and stored in a normal state. Therefore, as a material of the air bag, it is preferable to select a material that can be folded and deployed. As a specific material of the air bag, a flexible and high-strength material is preferably selected, and for example, a woven fabric using a high-strength resin fiber such as polyester and polyamide can be particularly preferably used.

The air bag according to the present invention may also include an open vent hole and an opening and closing mechanism for opening and closing the vent hole. By providing the air bag with the vent hole, the inflation fluid supplied to an inside of the air bag can be discharged to an outside through the vent hole, thereby reducing an internal pressure of the air bag. Further, the internal pressure of the air bag can be appropriately adjusted by opening and closing the open vent hole provided in the air bag using the opening and closing mechanism.

The present invention can also be understood as an invention of an air bag device that includes the inflation fluid generation source that supplies the inflation fluid to the air bag, in addition to the air bag according to the present invention described above.

The inflation fluid generation source in the air bag device preferably uses an inflator that generates gas as the inflation fluid, and in some cases, the inflation fluid generation source may generate an inflation fluid other than gas, for example, liquid or gel.

The inflation fluid generation source may be a device for supplying the inflation fluid to the air bag, and may be, for example, a so-called pyrotechnic type device including a gas generating agent that generates gas as the inflation fluid or a so-called hybrid type device in which a partition wall of a high-pressure container is broken and gas contained in the high-pressure container is supplied. The inflation fluid generation source may be entirely disposed outside the air bag, or may be partially or entirely disposed inside the air bag.

The air bag device may include other components. Examples of the other components include a retainer that accommodates at least a part of the inflation fluid generation source, a cover that surrounds at least a part of the air bag, a wire harness that electrically connects the inflation fluid generation source and an air bag control device, and an opening and closing mechanism that opens and closes a vent hole, but the air bag device is not limited thereto, and may include other components.

Hereinafter, the air bag according to the present invention will be described with reference to examples.

Embodiment 1

An air bag according to Embodiment 1 is a passenger seat air bag that is mounted on a rear side of an instrument panel of a vehicle and in front of a passenger seat.

Figure 1:
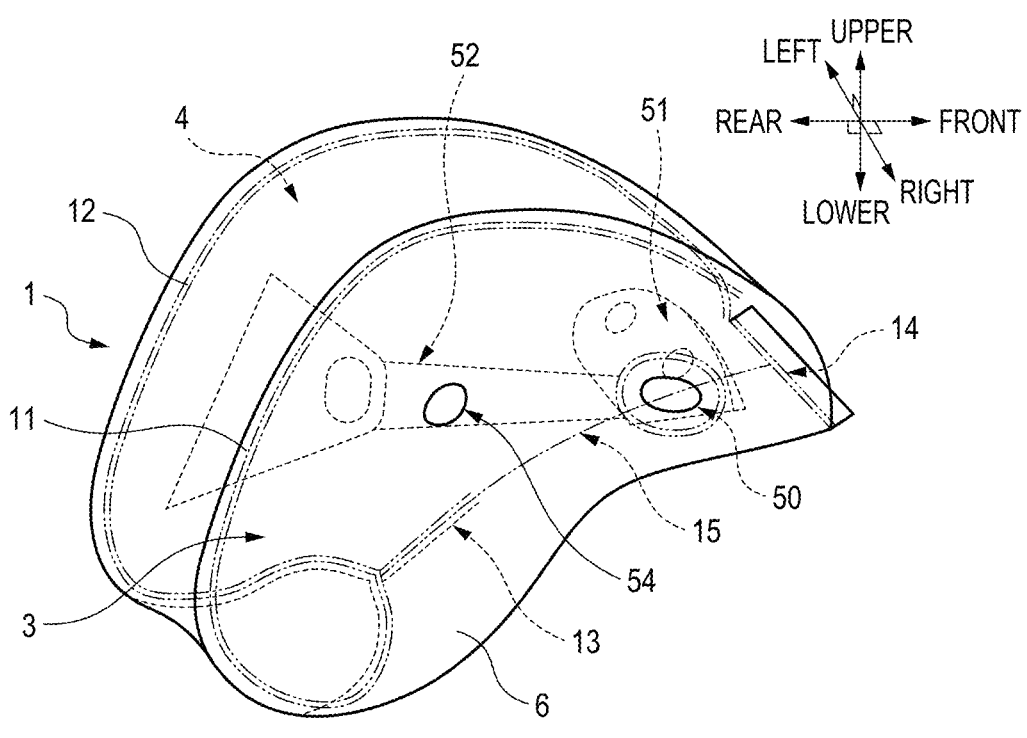
FIG. 1 is a diagram schematically illustrating a state in which a three-dimensional air bag according to Embodiment 1 is deployed and inflated.
Figure 2:
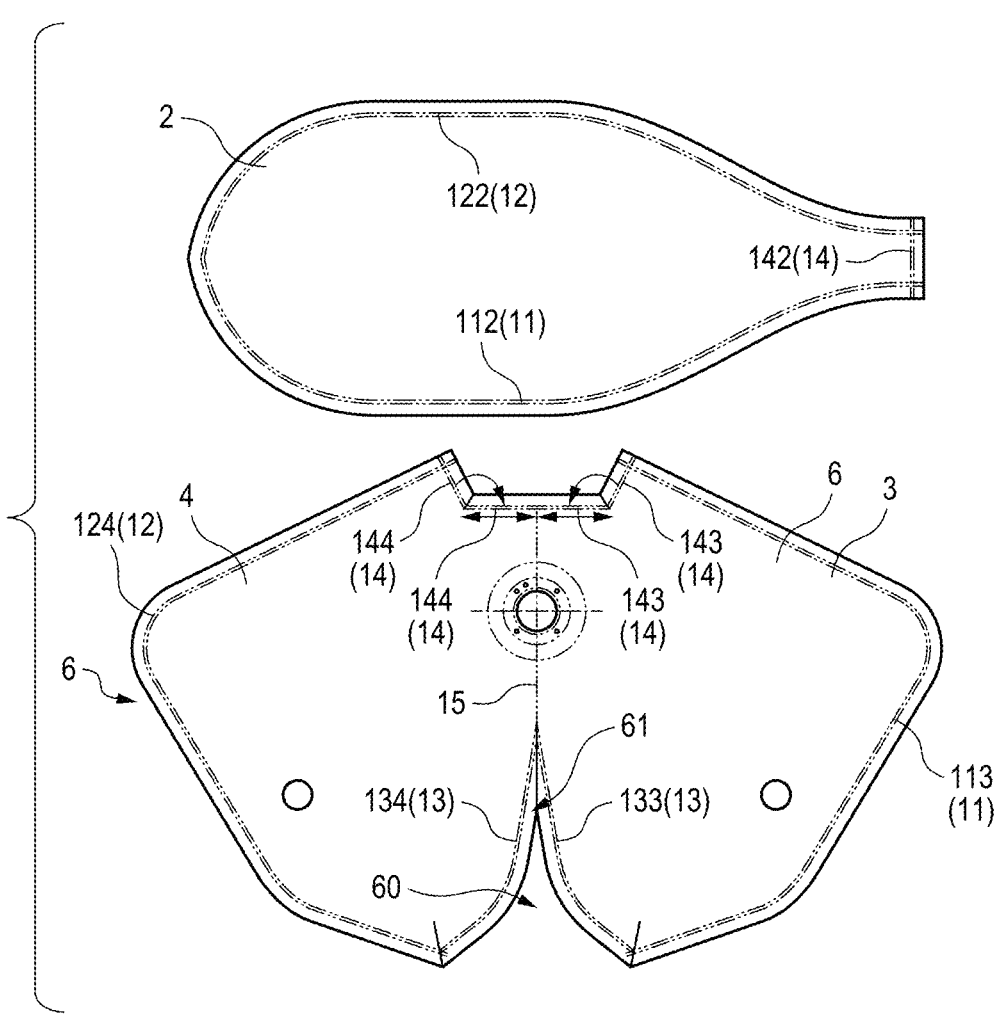
FIG. 2 is a diagram schematically illustrating a main panel, a first side panel, and a second side panel of the three-dimensional air bag according to Embodiment 1.

FIG. 1 is a diagram schematically illustrating a state in which the air bag according to Embodiment 1 is deployed and inflated. FIG. 2 is a diagram schematically illustrating a main panel, a first side panel, and a second side panel of the air bag according to Embodiment 1.

As illustrated in FIG. 1, an air bag 1 according to Embodiment 1 is formed by sewing the main panel 2 and a side panel 6 together. The side panel 6 includes a first side panel portion 3 and a second side panel portion 4.

The air bag 1 according to Embodiment 1 includes a first three-dimensional sewn portion 11, a second three-dimensional sewn portion 12, a plane sewn portion 13, an overlapped sewn portion 14, and a linear boundary portion 15. The first three-dimensional sewn portion 11, the second three-dimensional sewn portion 12, the plane sewn portion 13, and the overlapped sewn portion 14 are the sewn portions described above, that is, the sewn portions of the panels.

Among the sewn portions, the first three-dimensional sewn portion 11 is a portion in which the main panel 2 and the first side panel portion 3 of the side panel are sewn together.

The second three-dimensional sewn portion 12 is a portion in which the main panel 2 and the second side panel portion 4 of the side panel 6 are sewn together.

The plane sewn portion 13 is a portion in which the first side panel portion 3 and the second side panel portion 4 of the side panel 6 are sewn together.

The overlapped sewn portion 14 is a portion in which a part of the first side panel portion 3 folded in two, a part of the second side panel portion 4 folded in two, and a part of the main panel 2 are overlapped and sewn together.

As illustrated in FIG. 1, the entire plane sewn portion 13 and the entire linear boundary portion 15 is located on a lower surface of the air bag 1 at the time of deployment and inflation. A part of the linear boundary portion 15 is located on the lower surface and the front surface of the air bag 1 at the time of deployment and inflation.

Most of the first three-dimensional sewn portion 11 and most of the second three-dimensional sewn portion 12 are located on an upper surface of the air bag 1 at the time of deployment and inflation. A part of the first three-dimensional sewn portion 11 and a part of the second three-dimensional sewn portion 12 are located on the upper surface and the rear surface of the air bag 1 at the time of deployment and inflation.

The entire overlapped sewn portion 14 is located on a front surface of the air bag 1 at the time of deployment and inflation. It can also be said that the entire overlapped sewn portion 14 is located on the front surface and the lower surface of the air bag 1 at the time of deployment and inflation.

As illustrated in FIG. 2, a shape of the first three-dimensional sewn portion 11 of the main panel 2 in the natural state is different from a shape of the first three-dimensional sewn portion 11 of the first side panel portion 3 in the natural state.

Hereinafter, as necessary, the first three-dimensional sewn portion 11 of the main panel 2 in the natural state is referred to as a first three-dimensional sewn intended portion 112 of the main panel 2, and the second three-dimensional sewn portion 11 of the first side panel portion 3 in the natural state is referred to as a first three-dimensional sewn intended portion 113 of the first side panel portion 3.

A shape of the second three-dimensional sewn portion 12 of the main panel 2 in the natural state is different from a shape of the second three-dimensional sewn portion 12 of the second side panel portion 4 in the natural state.

Hereinafter, as necessary, the second three-dimensional sewn portion 12 of the main panel 2 in the natural state is referred to as a second three-dimensional sewn intended portion 122 of the main panel 2, and the second three-dimensional sewn portion 12 of the second side panel portion 4 in the natural state is referred to as a second three-dimensional sewn intended portion 124 of the second side panel portion 4.

A shape of the plane sewn portion 13 of the first side panel portion 3 in the natural state is the same as a shape of the plane sewn portion 13 of the second side panel portion 4 in the natural state.

Hereinafter, as necessary, the plane sewn portion 13 of the first side panel portion 3 in the natural state is referred to as a plane sewn intended portion 133 of the first side panel portion 3, and the plane sewn portion 13 of the second side panel portion 4 in the natural state is referred to as a plane sewn intended portion 134 of the second side panel portion 4.

A shape of the overlapped sewn portion 14 of the main panel 2 in the natural state, a shape of the overlapped sewn portion 14 of the first side panel portion 3 in the natural state, and a shape of the overlapped sewn portion 14 of the second side panel portion 4 in the natural state are the same.

Hereinafter, as necessary, the overlapped sewn portion 14 of the main panel 2 in the natural state is referred to as an overlapped sewn intended portion 142 of the main panel 2, the overlapped sewn portion 14 of the first side panel portion 3 in the natural state is referred to as an overlapped sewn intended portion 143 of the first side panel portion 3, and the overlapped sewn portion 14 of the second side panel portion 4 in the natural state is referred to as an overlapped sewn intended portion 144 of the second side panel portion 4.

The first side panel 3 in the natural state may include two overlapped sewn portions 14 (the overlapped sewn intended portion 143 of the first side panel portion 3), and the second side panel portion 4 in the natural state may include two overlapped sewn portions 14 (the overlapped sewn intended portion 144 of the second side panel portion 4).

As illustrated in FIG. 2, the side panel 6 in the natural state has a flat shape.

The first side panel portion 3 in the natural state and the second side panel portion 4 in the natural state have the same shape, and are disposed to be line-symmetrical with respect to the linear boundary portion 15 which is an imaginary line as an axis of symmetry. Further, the main panel 2 in the natural state has a line-symmetrical shape with a midline between the first three-dimensional sewn portion 11 and the second three-dimensional sewn portion 12, in other words, a midline between the first three-dimensional sewn intended portion 112 of the main panel 2 and the second three-three-dimensional sewn intended portion 122 of the main panel 2 as an axis of symmetry.

The air bag 1 according to Embodiment 1 includes the plane sewn portion 13 in which the first side panel portion 3 and the second side panel portion 4 are sewn together. The plane sewn portion 13 is continuous with the linear boundary portion 15.

As illustrated in FIG. 2, the plane sewn intended portion 133 of the first side panel portion 3 and the plane sewn intended portion 134 of the second side panel portion 4 have the same shape.

In addition, a cut portion 60 is formed between the plane sewn intended portion 133 of the first side panel portion 3 and the plane sewn intended portion 134 of the second side panel portion 4. The cut portion 60 has a tapered slit shape, and a tip portion 61 faces the linear boundary portion 15.

Hereinafter, a procedure for manufacturing the air bag 1 according to Embodiment will be described.

When the air bag 1 according to Embodiment 1 is manufactured, first, the first side panel portion 3 and the second side panel portion 4 are overlapped and sewn together such that the plane sewn intended portion 133 of the first side panel portion 3 and the plane sewn intended portion 134 of the second side panel portion 4 overlap with each other. Accordingly, the plane sewn portion 13 in which the first side panel portion 3 and the second side panel portion 4 are sewn together is formed.

Next, the first three-dimensional sewn intended portion 112 of the main panel 2 and the first three-dimensional sewn intended portion 113 of the first side panel portion 3 are gradually overlapped with each other and sewn together while shapes of one long side of the main panel 2 and a part of an outer periphery of the first side panel portion 3 are aligned with each other. Accordingly, the first three-dimensional sewn portion 11 in which the main panel 2 and the first side panel portion 3 are sewn together is formed, and the main panel 2 and the side panel 6 are integrated into a three-dimensional sheet shape.

Next, the second three-dimensional sewn intended portion 122 of the main panel 2 and the second three-dimensional sewn intended portion 124 of the second side panel portion 4 are gradually overlapped with each other and sewn together while shapes of one long side of the main panel 2 and a part of an outer periphery of the second side panel portion 4 are aligned with each other. Accordingly, the second three-dimensional sewn portion 12 in which the main panel 2 and the second side panel portion 4 are sewn together is formed, and the main panel 2 and the side panel 6 are integrated into a sack shape having an opened opening.

Next, a front portion of the main panel 2, a front portion of the first side panel portion 3, and a front portion of the second side panel portion 4 are overlapped and sewn together such that the overlapped sewn intended portion 142 of the main panel 2, the overlapped sewn intended portion 143 of the first side panel portion 3, and the overlapped sewn intended portion 144 of the second side panel portion 4 overlap with one another.

The overlapped sewn intended portion 144 of the first side panel portion 3 and the overlapped sewn intended portion 143 of the second side panel portion 4 are folded to have the same shape as the overlapped sewn intended portion 142 of the main panel 2 at the time of sewing.

Accordingly, the overlapped sewn portion 14 is formed in which a part of the main panel 2, a part of the first side panel portion 3, and a part of the second side panel portion 4 are overlapped and sewn together, and the main panel 2, the first side panel portion 3, and the second side panel portion 4 are integrated into a sack shape having a closed opening.

Thereafter, the air bag 1 according to Embodiment 1 illustrated in FIG. 1 is obtained by turning the air bag 1 inside out through an opening 50 provided on the lower surface of the air bag 1.

The opening 50 communicates with an inflator (not illustrated) and serves as an injection port for the inflation fluid from an outside toward an inside of the air bag 1.

In addition, inside the air bag 1, a flow straightening cloth 51 for controlling a flow direction of the inflation fluid injected into the air bag 1 from the opening 50 at the time of deployment and inflation, a tether (a tension cloth) 52 for preventing excessive inflation of the air bag 1 at the time of deployment and inflation, and the like are provided. Further, the first side panel portion 3 and the second side panel portion 4 of the air bag 1 are provided with a vent hole 54 having a through hole shape, and the air bag 1 is further provided with an opening and closing mechanism (not illustrated) that opens and closes the vent hole 54.

Although the present disclosure has been described above, the present invention is not limited to the above-described embodiments and the like, the elements described in the embodiments and the like can be appropriately extracted and combined, and various modifications can be made without departing from the scope of the present invention.

In addition, the description of the present invention is not limited to the citation relationships of claims at the beginning of the application, and discloses a technical idea obtained by appropriately combining the matters described in each claim.

What is claimed is:

1. A three-dimensional air bag in which a main panel and a side panel including a first side panel portion and a second side panel portion are sewn together, the air bag comprising:

a first three-dimensional sewn portion in which the main panel and the first side panel portion are sewn together, and a second three-dimensional sewn portion in which the main panel and the second side panel portion are sewn together, wherein at least a part of the first three-dimensional sewn portion and at least a part of the second three-dimensional sewn portion are located at an upper surface of the air bag when the air bag is deployed and inflated, a shape of the first three-dimensional sewn portion of the main panel in a natural state is different from a shape of the first three-dimensional sewn portion of the first side panel portion in the natural state, a shape of the second three-dimensional sewn portion of the main panel in the natural state is different from a shape of the second three-dimensional sewn portion of the second side panel portion in the natural state, wherein a plane sewn portion in which the first side panel portion and the second side panel portion are sewn together, at least a part of the plane sewn portion is at a lower surface of the air bag when the air bag is deployed and inflated, a shape of the plane sewn portion of the first side panel portion in the natural state and a shape of the plane sewn portion of the second side panel portion in the natural state are same, the main panel in the natural state has a line-symmetrical shape with a midline between the first three-dimensional sewn portion and the second three-dimensional sewn portion as an axis of symmetry, and a cut portion having a tapered slit shape is provided between the plane sewn portion of the first side panel portion in the natural state and the plane sewn portion of the second side panel portion in the natural state.

2. The three-dimensional air bag according to claim 1, further comprising:

an overlapped sewn portion in which a part of the main panel, a part of the first side panel portion, and a part of the second side panel portion are overlapped and sewn together, wherein at least a part of the overlapped sewn portion is at a front surface of the air bag when the air bag is deployed and inflated, and a shape of the overlapped sewn portion of the main panel in the natural state, a shape of the overlapped sewn portion of the first side panel portion in the natural state, and a shape of the overlapped sewn portion of the second side panel portion in the natural state are same.

3. The three-dimensional air bag according to claim 2, wherein the first side panel portion of the side panel in the natural state and the second side panel portion in the natural state have a same shape.

4. The three-dimensional air bag according to claim 1, wherein the first side panel portion of the side panel in the natural state and the second side panel portion in the natural state have a same shape.

5. A three-dimensional air bag in which a main panel and a side panel including a first side panel portion and a second side panel portion are sewn together, the air bag comprising:

a first three-dimensional sewn portion in which the main panel and the first side panel portion are sewn together, and a second three-dimensional sewn portion in which the main panel and the second side panel portion are sewn together, wherein at least a part of the first three-dimensional sewn portion and at least a part of the second three-dimensional sewn portion are located at an upper surface of the air bag when the air bag is deployed and inflated, a shape of the first three-dimensional sewn portion of the main panel in a natural state is different from a shape of the first three-dimensional sewn portion of the first side panel portion in the natural state, and a shape of the second three-dimensional sewn portion of the main panel in the natural state is different from a shape of the second three-dimensional sewn portion of the second side panel portion in the natural state, further comprising:

an overlapped sewn portion in which a part of the main panel, a part of the first side panel portion, and a part of the second side panel portion are overlapped and sewn together, wherein at least a part of the overlapped sewn portion is at a front surface of the air bag when the air bag is deployed and inflated, a shape of the overlapped sewn portion of the main panel in the natural state, a shape of the overlapped sewn portion of the first side panel portion in the natural state, and a shape of the overlapped sewn portion of the second side panel portion in the natural state are same, a plane sewn portion in which the first side panel portion and the second side panel portion are sewn together, at least a part of the plane sewn portion is at a lower surface of the air bag when the air bag is deployed and inflated, and a shape of the plane sewn portion of the first side panel portion in the natural state and a shape of the plane sewn portion of the second side panel portion in the natural state are same, wherein the main panel in the natural state has a line-symmetrical shape with a midline between the first three-dimensional sewn portion and the second three-dimensional sewn portion as an axis of symmetry, and a cut portion having a tapered slit shape is provided between the plane sewn portion of the first side panel portion in the natural state and the plane sewn portion of the second side panel portion in the natural state.

6. The three-dimensional air bag according to claim 5, wherein the first side panel portion of the side panel in the natural state and the second side panel portion in the natural state have a same shape.

* * * * *